Nov. 17, 1964   N. O. ROSAEN   3,157,596

OIL FILTERS

Filed Dec. 8, 1960

INVENTOR
NILS O. ROSAEN

BY Hutchinson & Milans

ATTORNEYS

United States Patent Office 3,157,596
Patented Nov. 17, 1964

3,157,596
OIL FILTERS
Nils O. Rosaen, Detroit, Mich., assignor to The Rosaen Filter Company, Hazel Park, Mich., a corporation of Michigan
Filed Dec. 8, 1960, Ser. No. 74,667
4 Claims. (Cl. 210—90)

The present invention relates to fluid filters and in particular to improvements in oil filters of the axially movable or slidable filter element or cartridge type, such as that shown and described in copending applications of Oscar E. Rosaen and Nils O. Rosaen, Serial No. 649,059, filed March 28, 1957, now Patent No. 3,053,389, issued September 11, 1962, and Serial No. 26,046, filed May 2, 1960, now abandoned.

Specifically the present invention is directed to a novel form of spring return means for the indicating mechanism of such filters, and to the novel association of the spring return means with the indicating arm mechanism of the type shown and described in said application Serial No. 26,046.

Among the objects of the invention is to provide an efficient operating spring return mechanism for the indicating arm mechanism of an oil filter of the axially movable cartridge type and one which will prevent the indicating mechanism from giving false readings as a result of momentarily excessively high volume flows through the filter which may occur in the operation of some hydraulic systems.

It is a further object of the invention to provide a simple, relatively inexpensive return spring means that can be easily and effectively installed in association with the indicating arm of an oil filter.

Other objects and advantages will be apparent to those skilled in the art upon reference to the following description and the accompanying drawing in which.

Oil filters of the type to which this invention relates are used in many hydraulically actuated systems to remove dirt, grit and the like foreign matter from the fluid of the system to prevent such matter from fouling the pump and other parts of the system. Such systems generally employ a fluid pump drawing oil from a source of supply and delivering the same under pressure throughout the fluid system for operation of suitable component parts thereof, after which the fluid is returned to the source of supply to be recirculated by the pump. Filters are generally installed in such systems between the source of supply and the intake to the pump.

In such systems, when the filter begins to become clogged with foreign matter screened from the fluid, such clogging, which reduces the oil flow through the filter unit, is difficult to detect before the system to which the oil is supplied becomes starved or receives less oil than is desirable for proper and efficient operation and protection of the system. Filters of the type shown in the prior applications are directed to a filter construction provided with a by-pass means for by-passing the oil or fluid of the system around the filtering element or cartridge when the element becomes excessively clogged with filtered dirt and in which provision is made for clearly indicating to an attendant the precise condition of the filter element at all times and which indicating means will clearly signal the need for changing or cleaning the filter element long before actual by-passing of the liquid occurs.

Figure 1:
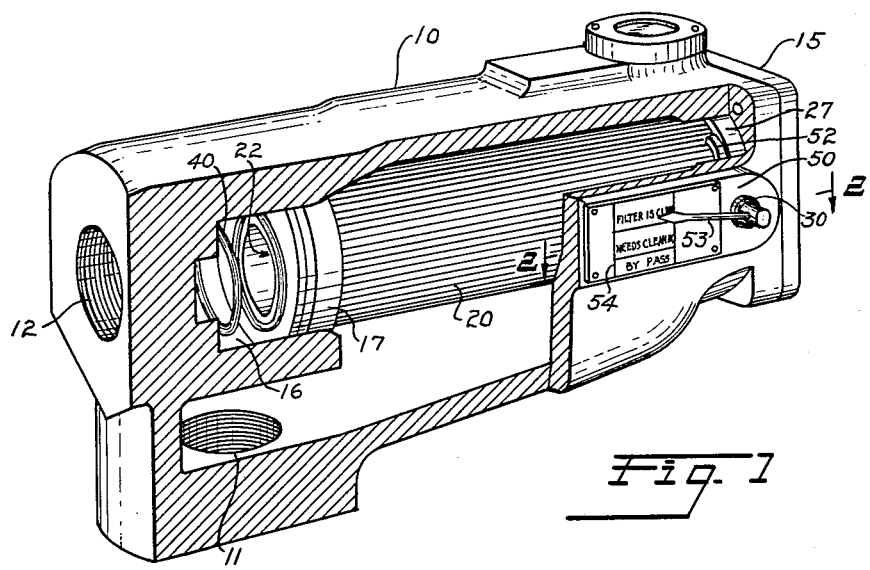
FIGURE 1 is a perspective view of the oil or fluid filter, with the housing broken away and shown in section, so as to reveal the filter cartridge and the association of the indicating mechanism with the spring return in relation to said cartridge.

In FIGURE 1 of the drawing will be seen an oil filter of the type embodied in application Serial No. 26,046 which comprises a generally cylindrical housing 10 provided near one end with a lateral boss through which is arranged the inlet 11 and at the same end is provided an axially arranged outlet 12. The other end of the housing is closed by a suitable cover or closure plate 15 removably secured to the housing by suitable bolts, not shown, whereby said closure plate on removal from the housing affords access to the interior of said housing for the removal and insertion of the filter element or cartridge 20.

Inside of the housing and coaxial with the outlet 12 the housing wall is finished to provide a cylinder 16 adapted to receive a cooperating piston 17, which piston is in the form of an annulus. Carried by the piston 17 and coaxial therewith is a cylindrical screen or filtering element 20, which is preferably seated upon a suitable shoulder formed in the piston and surrounding the opening 22 in the piston.

At the other end of the housing, closure plate 15 in accordance with the teachings of the prior application is provided on its inner face with a cylindrical boss which terminates in spaced tongues. Neither the boss nor the spaced tongues are shown in the present drawings since it is not believed necessary for the understanding of the present invention to make this disclosure and since the disclosure is adequately set forth in Serial No. 26,046. However, it is thought sufficient to point out that the boss carried by the closure plate is arranged coaxial with cylinder 16 and of smaller diameter than said cylinder and serves as a guide for a flanged ring 27 within which is seated the other end of screen 20. As also taught in the prior application, the screen or filtering element 20 together with its two end caps, piston 17 and flanged ring 27, are suitably fixed together as a unit by means of screws or bolts (not shown) passing through ring 27 and threaded into piston 17. By virtue of this construction, the removable filter cartridge, as it is called in the trade, consists of the filtering element or screen 20 plus the two end caps.

The filter cartridge, consisting of the assembly of piston 17, screen 20 and flanged ring 27, is maintained in the position shown in FIGURE 1 with the ring 27 bearing against the inner face of closure plate 15 with the ring 27 at the base of the boss carried by the closure plate, by means of a selected coil spring 40 seated between the end face of cylinder 16 and the adjacent face of the piston 17.

On one side of the housing is provided a flat, preferably rectangular, boss 50 having near one end thereof an opening through the boss and housing wall and acting as a bearing for a short shaft 51 carrying at its inner end a crank arm 52 and on its outer end an indicator hand 53. The free end of the crank arm 52 is positioned with its outer end arranged to bear against the flanged ring 27 to be thus actuated thereby on axial movement to the left, as viewed in FIGURE 1, of the filter cartridge, which will result in partial rotation of the hand 53 over suitable indicia 54 carried by the boss 50, thus indicating to the attendant from the hand position the condition of the filter screen or element.

The indicia 54 preferably contains such legends as "FILTER IS CLEAN," "NEEDS CLEANING" and "BY-PASSING." The indicator arm 53 is adjusted on the shaft 51 with reference to the crank arm 52, so that arm or hand 53 points to the "FILTER IS CLEAN" position when the outer end of the crank arm 52 is bearing against the flanged ring 27, it being understood, as heretofore mentioned, that said ring 27 is normally firmly held agaisnt the closure plate 15 by the coil spring 40.

The compression spring 40 is selected of a strength sufficient to retain the filter cartridge, when the filter element is clean, in the extreme righthand position of the housing as viewed in FIGURE 1. The spring selection will, of course, be based upon the rating of the pump in the particular system in which the filter unit is installed, consideration being given to the desired permissible pressure drop between the inlet 11 and the outlet 12 of the filter unit when the pump and system are in operation.

In the operation of the device, oil is drawn in through the inlet 11 through suction applied by the pump in the line connected to the outlet 12 and normally flows through the filter element 20 and out to the intake of the pump. When the screen 20 begins to become clogged with accumulated dirt and the pressure difference between the inlet and outlet of the housing rises above the selected or predetermined permissible pressure drop, as determined by the selected strength of spring 40, the filter cartridge unit begins to move to the left against the resistance of spring 40 until the flanged ring 27 has moved along the boss carried by the cover plate enough to expose the spaces between the tongues carried by the end of the boss to the incoming oil, which will allow at that time oil to by-pass the screen 20 and flow directly to the interior of the filter between the tongues.

As the filter cartridge gradually makes the above-identified movement toward the outlet end of the housing in response to the differential pressures involved, the flanged ring 27 will move the crank arm 52, which will in turn rotate the indicator arm 53 from the "FILTER IS CLEAN" position downwardly as viewed in FIGURE 1, to indicate the filter needs to be cleaned or changed for a new filter and eventually to the "BY-PASSING" position when by-passing is actually in progress. As pointed out in the prior application, there is a relatively long or extended period of movement of the ring 27 between the time it begins to leave the adjacent wall of the closure plate 15 and the time it exposes the openings between the tongues on the end of the boss to the incoming oil or fluid. There is thus a continued and adequate signal being given the attendant throughout this entire range of movement of the filter element so that the precise condition of the filter is known to the attendant at any moment of operation and long before actual by-passing of the screen or filter element.

In the prior construction whenever a clean filter cartridge is inserted into the filter housing and prior to resumption of operation of the system, the operator manually moves the indicator arm 53 to the "FILTER IS CLEAN" position on the legend plate which will bring the crank arm 52 firmly against the flanged ring 27. As the clogging of the filter progresses the hand 53 will be moved as described above. If the filter screen has become progressively clogged to the point where the cartridge has moved the hand to the "NEEDS CLEANING" position and this warning has gone unheeded by the operator prior to shutting down the system and the pump, the indicating arm 53 in the prior construction would remain in the "NEEDS CLEANING" position even though the system is idle, thus forewarning the operator prior to resumption of operation of the system that the filter is dirty and should be changed before operation begins. This, of course, is a decidedly important feature in the indicating mechanism shown in the prior application. However, in certain hydraulic installations and under certain unusual conditions, the idincating mechanism of the prior structure would give a false indication of the condition of the filter element.

For example, in certain hydraulic installations where the system is subjected to fairly frequent shut downs of appreciable time or the system is subjected to cold temperature conditions, the hydraulic fluid, which may be oil, is naturally cold when the system is put into operation. Under these conditions the flowability of the fluid is naturally greatly retarded at the outset of operation of the system as compared to the normal flowability of the fluid under normal conditions and after the system has been in operation for an appreciable time. Consequently, upon start up of the system the filter cartridge may very well move to the left away from the closure plate until the fluid has warmed up to normal operating temperatures.

Again in hydraulic systems where the line may be occasionally subjected to a momentary and excessively high volume flow of oil, which may pass through the filter housing, the filter cartridge may be moved by this brief excessive oil flow which would naturally move the indicating mechanism away from the "FILTER IS CLEAN" position to a position indicating the filter "NEEDS CLEANING" or even to "BY-PASSING" position.

In the prior construction if either of these conditions occurred and flow again returns to normal, the filter cartridge, assuming it was clean at the time of the cold start up or surge of flow, would promptly be returned to its normal "FILTER IS CLEAN" position by the coil spring 40 with the ring bearing against the cover plate 15. However, with this prior construction, the indicating hand 53 would still stay in the position to which it had been moved by the cartridge as a result of the cold start up or momentary surge of the fluid. Hence under these circumstances, the indicating hand would be giving a false indication of the condition of the filter, i.e. that it needed cleaning or was by-passing, when in fact, it was actually clean.

To overcome this inaccurate indication possibility in those installations where the flow of fluid may be momentarily subjected to occasional surges of excessive flow or retarded flow due to cold start ups, a novel form of spring return means has been devised to return the indicating mechanism to its proper and accurate indicating position following the passage of excessive surges or oil flows. The spring return means comprises a coil spring 30 formed of steel wire, suitably tempered and having preferably two or three adjacently disposed turns with the ends 31–32 of the coil bent laterally of the plane of the coil and disposed in opposite directions to each other. The diameter of the turns of the coil spring are formed somewhat greater than the diameter of the indicator hand carrying knob 35 mounted on the outer end of shaft 51, to permit the coil to be adequately expanded or contracted by movement of the knob and hand.

One end 32 of the coil spring assembly is anchored to the housing wall by being inserted in a suitable bored hole in the wall and the other end 31 is disposed with its outwardly extending end positioned to be contacted by the indicating arm or hand 53 as shown in the drawings.

In assembling the spring return the coil spring is slipped over the knob 35 beneath the arm 53 and the knob is then fixed to the shaft 51 by a suitable set screw or the like in the desired position, namely, to afford the proper angular relationship between the indicating hand 53 and the crank arm 52 so that the hand will be pointing to the "FILTER IS CLEAN" position when the cartridge is against the cover plate and the crank arm is bearing against the flanged ring 27. The end 31 of the coil spring is placed beneath the indicating arm 53 and the end 32 is inserted in the bored hole in the housing. The hole in the housing is placed at a point which will place the spring under stress when the spring is properly assembled with respect to the arm 53 as recited above.

While the spring may be arranged to have its coils contract or expand on rotation of the arm 53 in a downward direction, it is preferred that the coil be arranged as shown so that the turns will expand or open up as the arm moves away from the "FILTER IS CLEAN" position. In either arrangement of the spring, the same will be selected of suitable strength to return the hand 53 to the proper and accurate indicating position after the cartridge has moved to the left on an excessive flow or surge of oil and returned to the position shown in FIG. 1. The spring will urge the crank arm 52 into firm contact with the flanged ring 27 of the cartridge at all times.

While the present invention has been explained and described with reference to specific embodiments of structure, it will be understood, nevertheless, that numerous modifications and variations are susceptible of being incorporated without departure from the essential spirit or scope thereof. For example, the spring return device of the present invention may be used in the indicating mechanism of a pressure type fluid filter or on any form of filter embodying an indicating mechanism of this general type.

Figure 2:
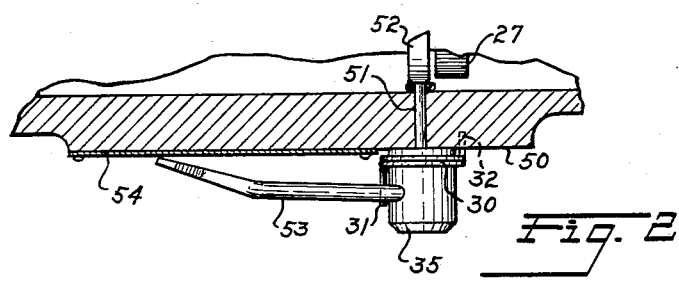
FIGURE 2 is an enlarged fragmentary, horizontal sectional view of the housing wall taken on the line 2—2 of FIG. 1 and showing the indicating arm mechanism and spring return in relation to the cartridge cap.
Figure 3:
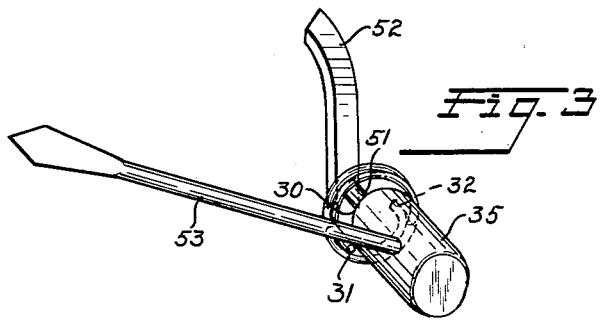
FIGURE 3 is an enlarged perspective view of the indicating arm mechanism and spring return with the filter housing removed.

Additionally, in lieu of the precise coil spring shown in FIGS. 1 to 3, a less desirable form of spring may be employed involving a leaf spring or small coil anchored at one end to the housing and having its other end resiliently bearing against or attached to the arm 53 to spring bias the indicating arm assembly with the outer end of crank arm 52 urged against the flanged ring 27 at all times.

Accordingly, it is not intended for an understanding of this invention to be limited by the foregoing description nor by the illustrations in the annexed drawing, except as indicated in the hereinafter appended claims.

I claim:
1. In a fluid filtering device comprising a housing having a fluid inlet and a fluid outlet, a movable filter cartridge positioned within said housing between said inlet and said outlet and having one end thereof abutting an end wall of said housing, spring biasing means urging said filter cartridge against said end wall, said filter cartridge movable whenever the pressure differential between said inlet and said outlet exceeds the strength of said biasing means, means for indicating movement of said filter cartridge comprising an indicating arm rotatably mounted exteriorly of said housing and carried by a shaft extending through a wall of said housing, a second arm carried by the inner end of said shaft with the end of said second arm engaging said filter cartridge, suitable indicia carried by said housing and correlated with respect to said indicator arm to convey the condition of said filter cartridge element, means for biasing said indicating means to follow at all times the movement of said filter cartridge including spring biasing means mounted about said shaft with one end of said biasing means anchored to the housing and the other end yieldingly bearing against said indicating arm.

2. In a fluid filtering device comprising a housing having a fluid inlet and a fluid outlet, a movable filter cartridge positioned within said housing between said inlet and said outlet and having one end thereof abutting an end wall of said housing, spring biasing means urging said filter cartridge against said end wall, said filter cartridge movable whenever the pressure differential between said inlet and said outlet exceeds the strength of said biasing means, means for indicating movement of said filter cartridge comprising an indicating arm rotatably mounted exteriorly of said housing and carried by a shaft extending through a wall of said housing, a second arm carried by the inner end of said shaft with the end of said second arm engaging said filter cartridge, suitable indicia carried by said housing and correlated with respect to said indicator arm to convey the condition of said filter cartridge element, a coil spring loosely and completely surrounding said shaft comprising a least one complete turn and having the terminal ends thereof bent at substantially right angles to the plane of said coil and extending in opposite directions away from said plane with one of said ends fixed to the wall of said housing and the other end positioned to bear against said indicating arm to thereby resiliently bias said arm and indicating mechanism to follow at all times the movement of said filter cartridge.

3. In a fluid filtering device comprising a housing having a fluid inlet and a fluid outlet, a filtering element positioned within said housing between said inlet and said outlet, by-pass valve means for by-passing fluid around said element when said element becomes excessively clogged, means for normally maintaining said by-pass valve means closed, means movable in response to excessive increases of pressure differential between said inlet and said outlet, indicating means movable in response to said last mentioned movable means, said indicating means comprising an indicating arm rotatably mounted exteriorly of said housing and carried by a shaft extending through a wall of said housing, a second arm carried by the inner end of said shaft having its end engaging said means movable in response to excessive increases in differential pressure, suitable indicia carried by said housing and correlated with respect to said indicator arm to convey the condition of said filtering element, and a coil spring loosely and completely surrounding said shaft comprising at least one complete turn and having the terminal ends thereof bent at substantially right angles to the plane of said coil and extending in opposite directions away from said plane with one of said ends anchored to the wall of said housing and the other end positioned to bear against said indicating arm to thereby resiliently bias said arm and indicating mechanism to follow at all times the movement of said means movable in response to excessive increases in differential pressure.

4. In a fluid filtering device comprising a housing having a fluid inlet and a fluid outlet, a filtering element positioned within said housing between said inlet and said outlet, by-pass valve means for by-passing fluid around said element when said element becomes excessively clogged, means for normally maintaining said by-pass valve means closed, means movable in response to increases of pressure differential between said inlet and said outlet on clogging of said filtering element, indicating means movable in response to said last mentioned movable means, said indicating means comprising an indicating arm rotatably mounted exteriorly of said housing and carried by a shaft extending through a wall of said housing, means carried by the inner end of said shaft and engageable with said means movable in response to increases in differential pressure, suitable indicia carried by said housing and correlated with respect to said indicator arm to convey the condition of said filtering element, and means for biasing said indicating arm to keep said means carried by the inner end of said shaft in engagement at all times with said means movable in response to increases in differential pressure, including spring biasing means anchored at one end to said housing with the other end yieldingly bearing against said indicating arm.

References Cited in the file of this patent
UNITED STATES PATENTS

| 742,099 | Thompson | Oct. 20, 1903 |
|---|---|---|
| 1,534,881 | Stokoe | Apr. 21, 1925 |
| 2,400,200 | Katcher | May 14, 1946 |
| 2,936,731 | Rosaen | May 17, 1960 |
| 2,937,754 | Kasten | May 24, 1960 |
| 3,056,379 | Thomas | Oct. 2, 1962 |